United States Patent [19]

Barchus

[11] Patent Number: 4,543,688
[45] Date of Patent: Oct. 1, 1985

[54] ANIMAL SKINNING HOLDER

[76] Inventor: Oscar W. Barchus, R.R. 1, Box 296, Bourbon, Mo. 65441

[21] Appl. No.: 575,055

[22] Filed: Jan. 30, 1984

[51] Int. Cl.$^4$ .............................................. A22C 15/00
[52] U.S. Cl. .................................... 17/44.3; 294/104; 294/79
[58] Field of Search ................. 17/44.2, 44.3; 294/79, 294/104, 103 R, 102 R

[56] References Cited

U.S. PATENT DOCUMENTS

| | | | |
|---|---|---|---|
| 749,318 | 1/1904 | Morris | 294/103 X |
| 861,078 | 7/1907 | Benedict | 294/104 |
| 1,186,672 | 6/1916 | Maginnis et al. | 294/104 |
| 1,271,876 | 7/1918 | Fairbanks | 294/104 |
| 2,622,914 | 12/1952 | Elling et al. | 294/79 |
| 3,570,049 | 3/1971 | Muckelrath | 17/44.2 |

Primary Examiner—Willie G. Abercrombie
Attorney, Agent, or Firm—Paul M. Denk

[57] ABSTRACT

In an animal skinning holder including a bracket adopted for securement to a supporting surface, a base plate incorporating wedge connecting device may removably support the bracket to the supporting surface. A pair of arms extend forwardly from the bracket, incorporating clamps at their forwardmost ends, and cooperate with ratchet jaws that are designed for binding, in a wedging fashion, if any animal leg inserted within the clamp in preparation for its skinning.

1 Claim, 6 Drawing Figures

U.S. Patent  Oct. 1, 1985  4,543,688
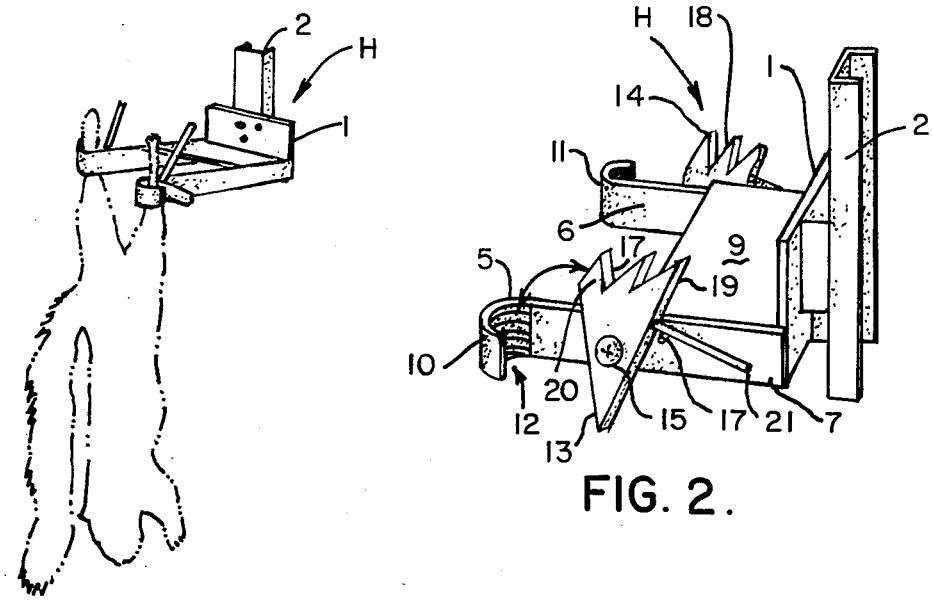
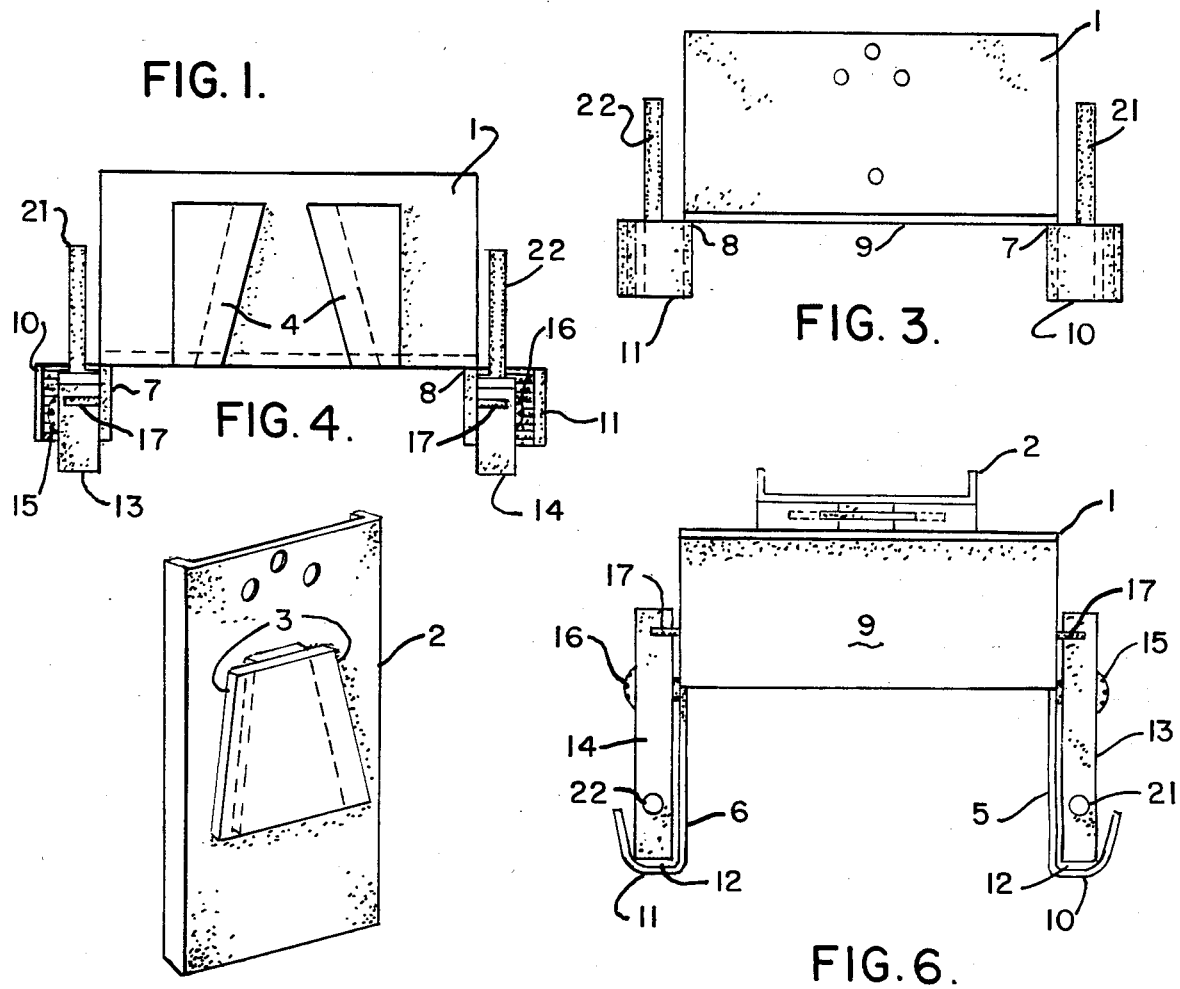

ANIMAL SKINNING HOLDER

BACKGROUND OF THE INVENTION

This invention relates generally to a support means, and more particularly relates to a holder for use for gripping and sustaining preferably small animals during their cleaning, but more particularly during skinning.

A variety of animal handling devices have been available in the art for the hunter, and in addition, various devices for gripping other components, and to retain them during processing, are known. For example, the U.S. Pat. No. 364,978, discloses the concept of utilizing a pair of clamping jaws for holding, in this particular instance, tobacco in place during its processing and treatment. The patent to Stevens, U.S. Pat. No. 649,115, shows a hanger for holding lengthy items in place, and in this particular instance, comprising billiard cues, brooms, or the like, and also which incorporates a pair of knurled end gripping levers, as shown, for binding against such items and suspending them in place. The patent to Newquist, U.S. Pat. No. 1,366,324, shows an implement for holding other devices, including one movable jaw, while the other jaw is slidable in and out for adjustment purposes, the entire device for use for supporting various implements in place.

More specifically with respect to devices for holding animals in place, as during their processing, the U.S. Pat. No. 1,866,900, shows a gambrel, which in this particular instance, is a device useful for holding animals, as during their slaughter, with this particular device including a pair of embracing arms that cooperate with curved portions for holding the animal in place during such treatment. The patent to Medigovich, U.S. Pat. No. 2,256,123, shows a game hanger, including a pair of barbed-like hooks, for holding the game during weighing, or the like. Furthermore, the patent to Johnson, U.S. Pat. No. 2,533,914, shows a poultry shackle, of the type that holds feet of the poultry in place apparently as it is suspended during movement through the processing plant. The method for holding the animals feet in place appears to be quite different from what is designed for the current invention. The patent to Elling, et al, U.S. Pat. No. 2,622,914, shows another form of gambrel, for holding animal feet in place as within a slaughter house, or the like. This particular device does show a gambrel that includes two clamping assemblies for holding each leg of the animal in place. The patent to Varner, U.S. Pat. No. 3,137,030, shows a small game holder, as for holding squirrels, and you can see that the device has a head clamp for holding the head of the animal in place, as when it is being dressed, or a foot clamp, for holding the animals hind legs, such as the squirrel as shown, in its FIG. 2, by means of penetrating barbs. The concept of the small game holder as shown in this earlier patent, when reviewed with the current invention, is quite dissimilar. The patent to Pietrowicz, U.S. Pat. No. 3,188,130, and which shows a small game hanging device, in this particular instance, wherein the feet of the rabbit are shown as held by loops for suspension during dressing. The patent to Ambill, No. 3,194,599, shows a form of self-clamping suspension device, for use for holding cattle, pigs, or the like, and operates for holding the hind feet of such animals in place, as during dressing.

The patent to Muckelrath, U.S. Pat. No. 3,570,049, shows a small game skinning board, and which is just a board, and which has slots formed upon its upper edge and wherein the feet or head of the animal can be inserted for suspension, as during dressing. The patent to Grubbs, U.S. Pat. No. 3,623,187, shows a skinning tool, for use for dressing animals, but the device appears to be quite different in structure, and in principle of operation, from the skinning holder of the current invention. Finally, the patent to Heightshoe, U.S. Pat. No. 3,945,083, discloses a game dressing board, which incorporates various front disposed piercing members for hooking into the hind legs of any animal to be cleaned, and which is structured quite differently from the invention described in this current application.

It is, therefore, the princpal object of this invention to provide an animal skinning holder that can suspend an animal by its hind or other feet, having structural support independently for each leg of the animal, and therein furnish stable suspension of the animal as during its skinning by the hunter.

Another object of this invention is to provide an animal skinning holder that can be removably mounted to any surface, upon a moments notice, through the use of removable bracket means.

Another object of this invention is to furnish an animal skinning holder, incorporating a pair of ratchet jaws, and which can be conveniently and quickly gripped into position for holding an animal during its skinning.

Another object of this invention is to provide an animal skinning device or holder wherein the means for a suspension of the animal is achieved through a wedging action, so that the more force and pull exerted upon the animal during its skinning, the more significant will be the wedging force that holds the hind or other legs of the animal fixed in place during said operation.

Another object of this invention is to provide ratchet jaws for an animal skinning device and which cooperates with clamp means, both of which are conveniently grooved or serrated in order to firmly affix the hind or other legs of an animal firmly in place during skinning.

These and other objects will become more apparent to those skilled in the art upon reviewing the summary of this invention, and upon undertaking a study of the description of its preferred embodiment.

SUMMARY OF THE INVENTION

This invention contemplates the formation of an animal skinning holder, one that is particularly useful for suspending small animals rigidly in place, and especially when excessive force is being applied to it as during a skinning operation. The holder incorporates a bracket means, generally of reasonable length so as to provide for its suspension away from a wall or other supporting surface, and to provide adequate clearance for the animal that will be suspended from the ends of arms that extend outwardly and generally horizontally from the said bracket. The bracket means is designed to cooperate with a wedging type of support, and which support can be permanently affixed to any supporting surface, such as a tree, or the wall of a building, so that the bracket can be slid into an interlocking position upon the wedging device and be supported firmly in place.

There is at least one arm that extends forwardly and integrally from the bracket means, preferably there being two arms in number, spaced apart a reasonable distance so as to provide for a widened support for the animal being held, and the arm or each arm proximate its forwardly extending end incorporates a formed clamp, generally shaped from the end of the arm itself, as through its bending over, and therein provides an arcuate or other shaped insert area wherein the arms, but preferably legs, of the animal can be inserted in preparation for its suspension. Then, each arm just rearwardly of its formed clamp incorporates a ratchet jaw, which is pivotally mounted to the arm at said location, so that the jaw can be pivoted into an upward and rearward direction and to open the clamp for insertion or removal of the animal leg, or in the alternative, when a skinning operation is to be performed, and the leg of the animal has been inserted within the formed arm clamp, the ratchet jaw may be pivoted forwardly, and downwardly into a forceful contact against the backside of the inserted leg, and therein function as a wedging type grip against the inserted leg and hold the same tightly in position in preparation for skinning of the retained animal. A rod or other handle is provided upon the ratchet jaw in order to facilitate its grasping, as by the hand of the skinner, either when locating an animal into the holder, or for opening of the same for animal removal.

BRIEF DESCRIPTION OF THE DRAWINGS

In the drawings, FIG. 1 provides an isometric view of the animal holder of this invention, showing in phantom line a squirrel being suspended for skinning;

FIG. 2 provides an isometric view of the invention from another angle;

FIG. 3 is a front view thereof, with the surface support means removed;

FIG. 4 is a back view thereof;

FIG. 5 is an isometric view of the surface support means; and

FIG. 6 is a top view of the entire animal skinning holder of this invention.

DESCRIPTION OF THE PREFERRED EMBODIMENT

In referring to the drawings, and in particular FIGS. 1 and 2, the animal skinning holder H of this invention can be readily seen. The invention incorporates a bracket means 1 that is generally arranged rearwardly of the structured device and which can be affixed either permanently to a suporting surface, such as the wall of a building, tree, or the like, or a wedging support means, as at 2, may be fixed to such supporting surfaces, and have the bracket means slid into wedging engagement therewith, in the manner as can be seen. A base plate incorporating wedging means 2 has a pair of upwardly inclined and narrowing ribs, as at 3, and which cooperate for receiving in a wedging relationship similar type and complimentary wedging means 4 that are intergrally formed upon the backside of the bracket means 1. But, as can be understood, the actual means for adhering this structure to a supporting surface can take any form, such as by permanent mounting, or where it is desirable to be able to readily remove the holder from its operating position, then the form of wedge adhering means 2, as previously explained, can be utilized.

The bracket means 1 includes at least one forwardly extending arm, in this particular instance, comprising a pair of arms 5 and 6, and which are integrally connected with the bracket means, at their rearward ends, as at 7 and 8, and which also incorporates a structural support means, 9, intermediate thereof, so as to add to the bracing and structural strength of the fabricated holder, and in addition, provide a tray upon which a knife, or other tools, may be temporarily laid.

At the opposite or forwards ends of the extending arms, there are formed as by means of stamping or other operation, as at the end of each arm, a formed clamp, as at 10 and 11, respectively, at the ends of each of the arms 5 and 6, and which are turned preferably outwardly, although inwardly would work just as effectively, and afford spacing, as at 12, and into which the legs or arms of any animal can be inserted, as during preparation and performance of a skinning function. Obviously, these spacings 12 will be to that dimension which is desired for the type of skinning holder designed, which in the particular instance shown, may be used for squirrels and rabbits, but if animals of any larger size are to be skinned, then obviously the proportions of the skinning holder will be amplified to accommodate the larger animal leg structure.

Provided forwardly of each arm is a ratchet jaw, there being one such jaw 13 and 14 provided upon each extending arm, and which jaws are pivotally mounted as by means of their pivot pins 15 and 16 to the said arms. The ratchet jaws are designed for pivoting both forwardly and rearwardly, generally upwardly of their formed arms, and can be either pivoted into an upward and rearward direction, as shown, as when not in use, or each ratchet jaw can be pivoted forwardly and downwardly, into an inserting relationship within the spacings 12 of their respective clamps 10 and 11. There is designed clearance for the partial insertion of each ratchet jaw end, as at the serrated ends 17 and 18, to provide for accommodating of these ratchet jaws into the said spacings 12, in order to function as a means for binding against any animal leg inserted within the formed clamps, and therein rigidly retain the same during a skinning operation.

It is to be noted that these serrated edges 17 and 18 of the ratchet jaws 13 and 14 are of a reducing radius, as from each jaw edge 19 to the lower jaw edge 20, so that the jaw edge 20 can be easily inserted within the clamp spacing 12, to assure for an initial contact of any animal leg enclosed therein, but that due to the increasing radii of the formed jaw edge, as it approaches the clamp insertion its upper edge 19, the animal leg will be tightly bound and wedged in place within the clamp spacing 12. In fact, it is desirable that the upper jaw edges 19 have sufficient length that they will contact or come close to the inner surface of the clamps 10 and 11, so as to prevent a full pivot through of the ratchet jaw of their respective clamps 10 and 11.

It can also be seen that the handle-like rods 21 and 22 are provided upon each of their respective ratchet jaws 13 and 14, as shown, so that the hunter can grip these rods when either manipulating the ratchet jaws into a wedging and clamping position of any animal leg inserted within the clamp spacing 12, or in the alternative, when a skinning function is completed, the rod may be gripped and pulled upwardly for inducing an upward pivot of each ratchet jaw in order to free the animal leg from its gripping within the arm clamps 10 and 11. Thus, it can be seen that there is herein provided an animal skinning holder that is very stable in structure, can be rigidly supported and fixed into position during usage, but which can be easily and readily manipulated by the hunter, when cleaning his game, with a minimum of effort.

It is to be noted that there are pins, as at 17, disposed extending from each of the arms 5 and 6, and these pins are provided for contacting with the rods 21 and 22, as when the jaws are pivoted rearwardly into their most open position, or in the alternative, for contacting with the upper surface of each of the jaws 13 and 14, as when these jaws are pivoted forwardly and downwardly into their fully inserted position and rather horizontally aligned within the spacing 12 of each clamp 10 and 11, respectively. Thus, these position pins 17 are provided for limiting the extent of pivot of each of the jaws 13 and 14.

Variations or modifications in the structure of the animal skinning holder of this invention may occur to those skilled in the art upon reviewing the description provided herein. Such variations or modifications, if within the spirit of this invention, are intended to be encompassed within the scope of any claims to patent protection issuing hereon. The description of the preferred embodiment made herein, and the display in the drawings of the animal holder of this invention, are set forth for illustrative purposes only, and are not to be interpreted as limiting any obtained patent protection.

Having thus described the invention, what is claimed and desired to be secured by Letters Patent is:

1. An animal skinning holder including a bracket means adapted for stable securement to any supporting surface, a pair of arms extending forwardly of the bracket means, said arms being spaced apart, each arm having an integrally formed clamp extending forwardly and laterally thereof, each clamp incorporating an arcuate shape and extending laterally of the arm for reception of an animal part therein during a skinning operation, a pair of ratchet jaws, one of each ratchet jaw pivotally mounting to an arm, one of said clamps being arranged forwardly of each ratchet jaw with each clamp and jaw combination disposed for holding a part of the animal in place, each ratchet jaw disposed for achieving a wedging insertion within its associated clamp during application, each ratchet jaw having a pivotal movement between an upright and nonwedging position into a downward and forward movement for wedging an animal part in place during a skinning operation, each ratchet jaw having a serrated clamping edge, formed of reducing radius to facilitate the tight wedging of an animal part in place, the inner arcuate surface of each clamp incorporating means for facilitating the gripping of any animal part therein, means operatively associated with each jaw to limit the extent of pivot of the jaw during its application, said ratchet jaws being pivotally mounted to the arms and being disposed for vertical pivoting into an upper entrance into their respective clamps for their wedging securement of an animal part therein, a rod provided upon each ratchet jaw and being exposed for grasping when forcing a ratchet jaw into position for wedging an animal part within the associate arm clamp, the interior of each clamp facing towards its associated ratchet jaw including grooved means for facilitating the gripping of any animal part therein, a pin associated with each arm and provided for limiting the extent of pivot of each jaw during usage, a base plate operatively associated with the bracket means and designed for removably mounting of the holder to a supporting surface, and support means arranged intermediate the extending arms to structurally reinforce and function as a tray during usage.

* * * * *